United States Patent
Pham et al.

(10) Patent No.: US 9,600,049 B2
(45) Date of Patent: Mar. 21, 2017

(54) MOTION FENCING

(71) Applicant: Apple Inc., Cupertino, CA (US)

(72) Inventors: Hung A. Pham, Oakland, CA (US);
Parin Patel, San Francisco, CA (US);
Venu M. Duggineni, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/913,234

(22) Filed: Jun. 7, 2013

(65) Prior Publication Data
US 2014/0365803 A1 Dec. 11, 2014

(51) Int. Cl.
*G06F 1/32* (2006.01)
*G06F 1/26* (2006.01)
*G06F 1/00* (2006.01)
*G06F 1/16* (2006.01)
*G06F 3/01* (2006.01)

(52) U.S. Cl.
CPC .......... *G06F 1/3206* (2013.01); *G06F 1/1694* (2013.01); *G06F 1/3287* (2013.01); *G06F 3/017* (2013.01); *G06F 2200/1637* (2013.01); *Y02B 60/1282* (2013.01)

(58) Field of Classification Search
CPC ..................................... G06F 1/26; G06F 1/32
USPC ......................................... 713/300, 423, 340
See application file for complete search history.

(56) References Cited

U.S. PATENT DOCUMENTS

| | | | |
|---|---|---|---|
| 6,037,748 A * | 3/2000 | Yee et al. | 320/127 |
| 7,511,699 B2 * | 3/2009 | Shin | 345/166 |
| 2004/0181703 A1 * | 9/2004 | Lilja et al. | 713/324 |
| 2005/0212759 A1 | 9/2005 | Marvit et al. | |
| 2007/0102525 A1 * | 5/2007 | Orr | G06F 1/3203 235/472.01 |
| 2007/0288779 A1 * | 12/2007 | Kim | 713/320 |
| 2010/0048256 A1 * | 2/2010 | Huppi et al. | 455/574 |
| 2010/0167792 A1 * | 7/2010 | Chen et al. | 455/566 |
| 2010/0235667 A1 * | 9/2010 | Mucignat et al. | 713/323 |
| 2011/0143768 A1 * | 6/2011 | Lane et al. | 455/456.1 |
| 2012/0023354 A1 * | 1/2012 | Chino | 713/323 |
| 2012/0254648 A1 * | 10/2012 | Hashimoto | 713/324 |
| 2012/0302163 A1 * | 11/2012 | Kitchen | 455/41.1 |
| 2014/0013141 A1 * | 1/2014 | Heo et al. | 713/323 |

OTHER PUBLICATIONS

International Search Report and Written Opinion of the International Searching Authority, PCT Application Serial No. PCT/US2014/037922, Jul. 29, 2014, 10 pp.

* cited by examiner

*Primary Examiner* — Phil Nguyen
(74) *Attorney, Agent, or Firm* — Fish & Richardson P.C.

(57) ABSTRACT

In some implementations, a mobile device can be configured with virtual motion fences that delineate domains of motion detectable by the mobile device. In some implementations, the mobile device can be configured to invoke an application or function when the mobile device enters or exits a motion domain (by crossing a motion fence). In some implementations, entering or exiting a motion domain can cause components of the mobile device to power on or off (or awaken or sleep) in an incremental manner.

18 Claims, 7 Drawing Sheets

MOTION FENCING

TECHNICAL FIELD

The disclosure generally relates to power management for mobile devices.

BACKGROUND

Modern mobile devices often include sensors for detecting motion of the mobile device. For example, mobile devices can include accelerometers and/or gyroscopes for detecting motion and determining orientation of the mobile device. Some mobile devices can be configured to dynamically adjust functionality, features, user interfaces and/or operations of the mobile device based on detected motion.

SUMMARY

In some implementations, a mobile device can be configured with virtual motion fences that delineate domains of motion detectable by the mobile device. In some implementations, the mobile device can be configured to invoke an application or function when the mobile device has entered or exited a motion domain (by crossing a motion fence). In some implementations, entering or exiting a motion domain can cause components of the mobile device to power on or off (or awaken or sleep) in an incremental manner.

Particular implementations provide at least the following advantages: Motion fencing provides an easy way to classify motion detected by the mobile device and trigger applications, functions, alerts and/or other operations of the mobile device based on the class. Using motion fences to gradually start, stop or wake up components, sensors, microcontrollers and other processors of the mobile device allows the mobile device to conserve energy while enabling the functionality needed to process motion measurements.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

For mobile devices, motion can be a key predictor of a user's desire for interaction. Motion can also be an indicator of activities that are of interest to the user. Motion fences provide a mechanism to anticipate and realize user needs with minimal power impact. In some implementations, motion fences establish envelopes around distinct motion domains that are characterized by features of a motion signal or motion measurements. Motion domains, as delineated by motion fences, can correspond to qualitatively different motion profiles. The motion of the mobile device can cause the mobile device to cross over a motion fence. Crossing a motion fence can cause the mobile device to trigger motion-based alerts, service wakes, invocations of applications and/or functions, and/or a request for additional motion analysis.

Figure 1:
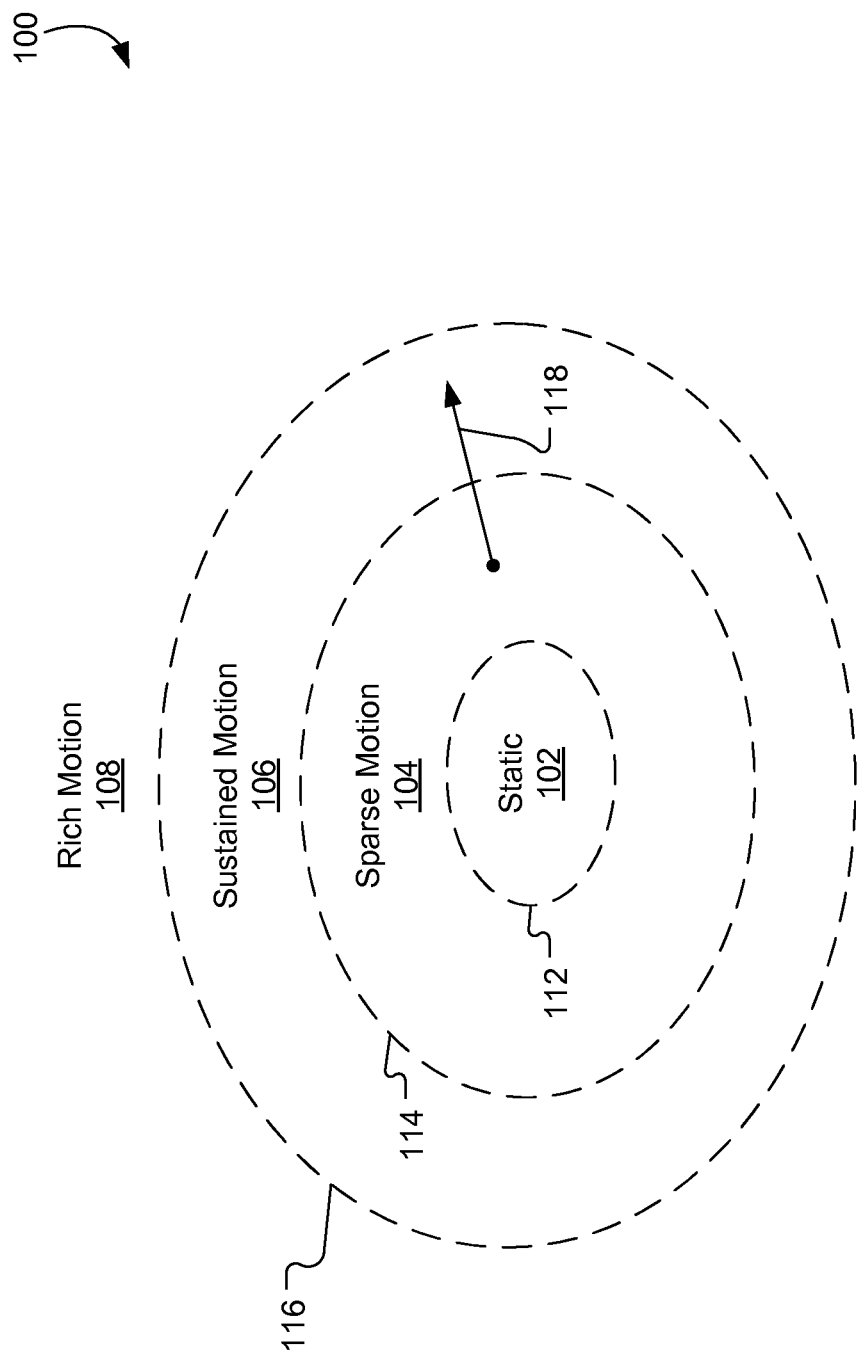
FIG. 1 illustrates example categories of motion fences.

FIG. 1 illustrates example motion domains and motion fences. In some implementations, a mobile device can be configured with motion fences. For example, a motion fence can be defined by motion criteria. For some motion fences the motion criteria can be based on basic motion measurements, such as frequency of motion or magnitude of motion. For some motion fences the motion criteria can be based on how long the motion is detected (e.g., for how much time) and/or whether the motion can be identified or correlated to a real world cause of the motion.

In some implementations, each motion fence can be used to delineate motion domains. For example, in FIG. 1, each dashed line can represent a motion fence. The area between each dotted line or outside the dotted lines represents a motion domain. For example, motion domain 102 can be a "static" domain. A mobile device can be in the "static" domain when the device is motionless or near motionless. Motion domain 104 can be a "sparse motion" domain. A mobile device can be in the "sparse motion" domain when the mobile device detects a small motion. The dashed line between motion domain 102 and motion domain 104 is the motion fence 112 between the static domain and the sparse motion domain. Motion fence 112 can be associated with motion criteria that define when the mobile device has crossed from static domain 102 into sparse domain 104. For example, the motion criteria for motion fence 112 can define that any motion above a threshold value (e.g., magnitude) will cause the mobile device to cross motion fence 112 from the static domain 102 into the sparse domain 104.

In some implementations, motion fence 114 can be associated with motion criteria that define when the mobile device crosses from sparse domain 104 into "sustained motion" domain 106. For example, the motion criteria for motion fence 114 can define that motion that has been sustained for a period of time can cause the mobile device to cross motion fence 114 from the sparse domain 104 into the sustained motion domain 106. For example, an increase in the magnitude and/or frequency of motion for longer than a threshold period of time can cause the mobile device to transition from sparse domain 104 into the sustained domain 106.

In some implementations, motion fence 116 can be associated with motion criteria that define when the mobile device crosses from sustained motion domain 106 into "rich motion" domain 108. For example, the motion criteria for motion fence 116 can define that motion that exceeds a threshold magnitude and/or a threshold frequency for longer than a threshold period of time can cause the mobile device to cross motion fence 116 from the sustained motion domain into the rich motion domain. Thus, the sustained motion domain 106 can correspond to a short duration, high magnitude motion or a long duration, high frequency motion while the rich motion domain 108 can correspond to high magnitude, high frequency motion for a long duration.

In some implementations, entering or exiting a motion domain or crossing a motion fence can trigger an operation of the mobile device. In some implementations, motion fences and motion domains can be used to trigger start up of system services when the device is picked up to minimize user perceived latency. Motion fences can trigger modulation of cellular and WiFi™ scanning frequencies based on patterns of motion to optimize power versus performance. For example, if the device is static (not moving), the frequency of cellular and WiFi scanning can be reduced to conserve battery power because the cellular and/or WiFi environment is unlikely to change. Motion fences can be used to start counting steps as a user begins walking or running Motion fences can be used to provide context (e.g., is the user walking, driving, running, biking, etc.) for map routing or map search results.

In some implementations, crossing a particular motion fence in a particular direction can trigger an operation of the mobile device. For example, a transition 118 from motion domain 104 to motion domain 106 can trigger a particular operation of the mobile device while a transition from motion domain 106 to motion domain 104 can trigger a different operation of the mobile device even though both transitions crossed the same motion fence 114. For example, transitioning from sparse motion domain 104 to sustained motion domain 106 can indicate that the user has picked up and is looking at the mobile device and that the mobile device should start up system services or frequently used applications on the mobile device. Transitioning from sustained motion domain 106 to sparse motion domain 104 can indicate that the user has placed the mobile device in a pocket or on the user's lap and that the mobile device should shut down or reduce the power to some components of the mobile device.

Figure 2:
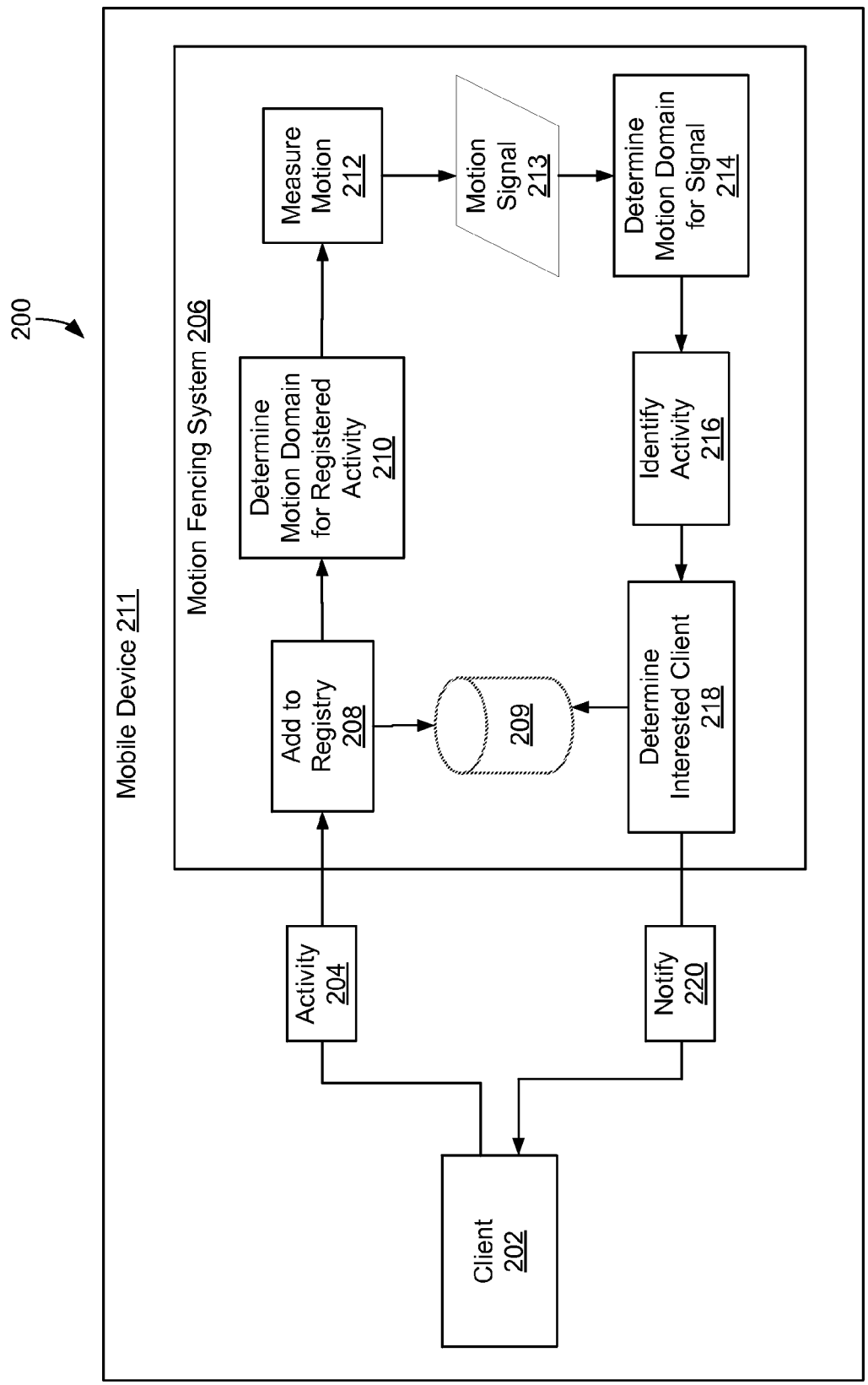
FIG. 2 illustrates an example correlation between motion fences and real world motion.

FIG. 2 illustrates an example system 200 for registering a motion fencing client for an activity of interest. For example, a client 202 can register with motion fencing system 206 to be notified when the mobile device enters a motion domain or crosses a motion fence. In some implementations, client 202 can request to be notified when a mobile device enters a motion domain or crosses a motion fence. For example, client 202 can be an application, function, utility or other component of the mobile device.

In some implementations, client 202 can send a request 204 to motion fencing system 206 indicating a type of activity that the client 202 is interested in. For example, the activity could be that the user has picked up the mobile device. The activity could be that the user is walking, driving or running. The activity can be any type of activity that can be identified based on one or more patterns of motion detected by the mobile device.

In some implementations, motion fencing system 206 can add 208 a client identifier and the specified activity of interest to a registry 209. For example, motion fencing system 206 can be a system or subsystem of the mobile device. Motion fencing system 206 can maintain a lookup table in registry 209 that maps client identifiers to activities of interest received from clients on the mobile device. The registry 209 can be used to determine which clients are interested in different activities or types of motion observed or measured by the mobile device.

In some implementations, motion fencing system 206 can determine a motion domain 210 that corresponds to the activity that the client is interested in. For example, if the activity is "running," the motion fencing system 206 can categorize running as a "rich" motion activity and map the running activity to the rich motion domain (e.g., rich motion domain 108 of FIG. 1). If the requested activity is "picked up," the motion fencing system 206 can categorize "picked up" as sustained motion activity and map the running activity to the sustained motion domain (e.g., sustained motion domain 106 of FIG. 1). If the requested activity is "viewing," the motion fencing system 206 can categorize "viewing" as a transition (e.g., crossing a motion fence in a specific direction) from the sustained motion domain to the rich motion domain.

In some implementations, motion fencing system 206 can measure the motion of the mobile device 211. For example, the mobile device 211 can be configured with one or more motion sensors (e.g., accelerometer, gyroscope, etc.) that can measure the motion of the mobile device. The motion sensors can generate motion signals 213 (e.g., measurements) that can be analyzed to determine, for example, changes in the magnitude and frequency of the signals generated by the motion sensors. The motion signals can be analyzed over time to determine patterns of motion that correspond to different activities.

In some implementations, the motion fencing system 206 can determine a motion domain 214 based on the motion signals 213. For example, motion fencing system 206 can be configured with motion fences that bound motion domains. The motion fences can be defined in terms of thresholds of motion and/or motion criteria that separates each motion domain. For example, a motion fence that bounds the "static" motion domain and separates the static motion domain from the "sparse" motion domain can be defined by any detected motion that exceeds a threshold magnitude and/or threshold frequency. The threshold magnitude and/or threshold frequency can be very small so that any motion of the device from a stationary position will cross the motion fence. This threshold comparison can be based on raw or unprocessed motion data (e.g., unprocessed motion signal). In some implementations, the motion fences can be defined in terms of more complex motion data that is derived from a motion signal. For example, motion fences can be defined in terms of transformations (e.g., Fourier transformations, signal filtering, etc.) performed on motion signals and/or patterns of motion observed in motion signals.

In some implementations, the motion fences can be defined to create motion domains that cover a variety of different activities that have similar motion characteristics. For example, walking and running are different activities that have similar motion signal characteristics and that might fall within the same motion domain (e.g., rich motion domain). Thus, a single motion domain, as delineated or constrained by the motion fences, can correspond to many different types of activities.

In some implementations, once a motion domain is determined 214 based on the motion signals 213, the motion fencing system 206 can identify an activity 216 that corresponds to the motion signals 213. For example, the motion signal can include patterns of motion that can be correlated to various activities. For example, the motion signals 213 can include a pattern of motion that correlates to a user walking with the mobile device. The motion signal can include a combination of patterns of motion. For example, the motion signals 213 can include a pattern of motion that correlates to the mobile device 211 being picked up by the user and another pattern of motion that correlates to the mobile device 211 being held in front of the user (e.g., high frequency, low magnitude motion). In some implementations, the combination of patterns of motion can correspond to a transition from one motion domain to another motion domain (e.g., sustained motion domain to rich motion domain). The motion signals 213 can be analyzed to determine patterns of motion that indicate that the mobile device is stationary (e.g., on a table), that the mobile device is being carried while a user is running, driving, or biking, for example.

In some implementations, once the motion fencing system 206 has identified the activity 216 based on the motion signals 213, the motion fencing system 206 can determine if any client is interested in the identified activity. For example, motion fencing system 206 can reference the aforementioned lookup table in registry 209 to determine which clients are interested in the identified activity. The motion fencing system 206 can then send a notification to the interested client(s) indicating that the client's activity of interest has occurred 220.

Figure 3:
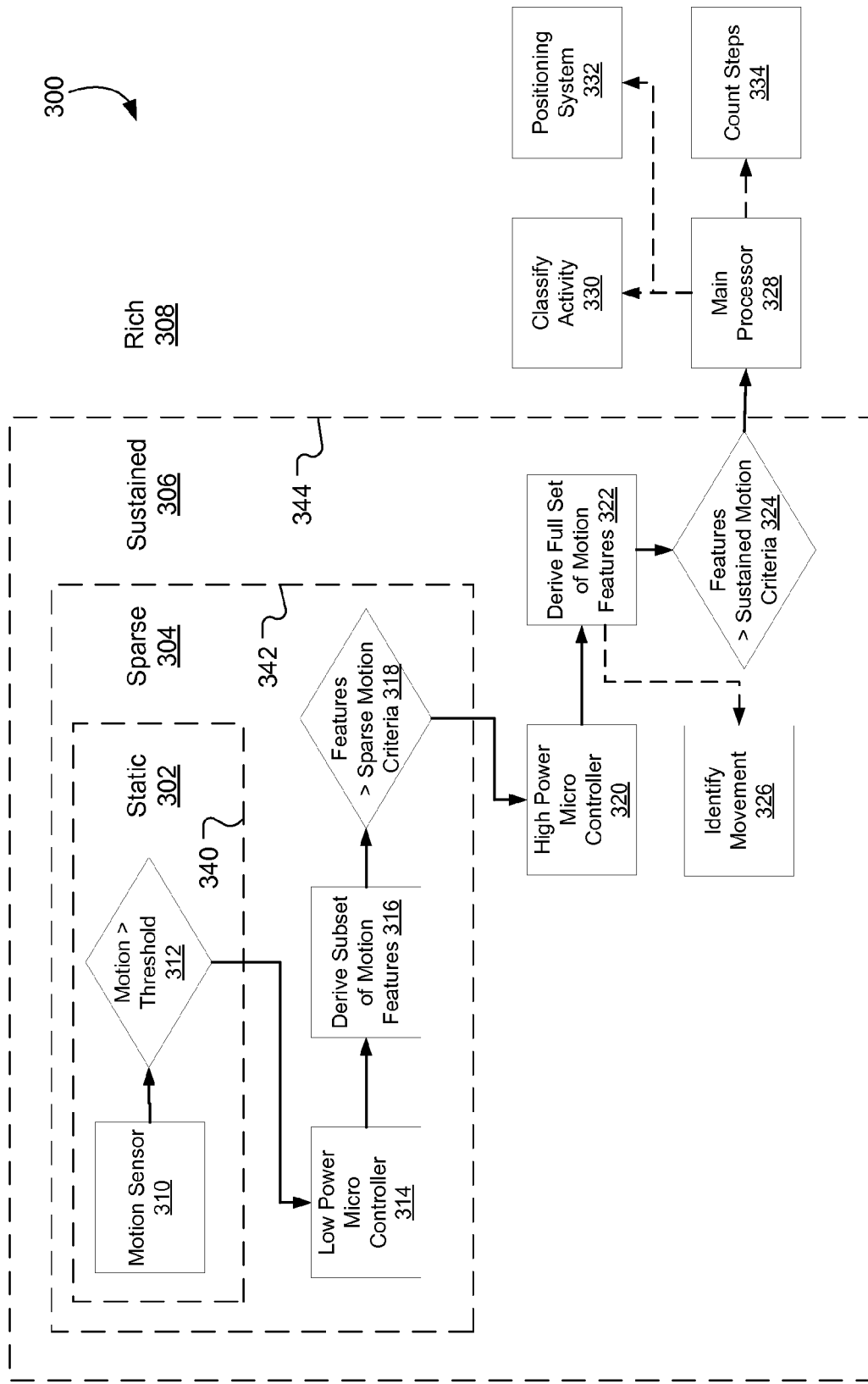
FIG. 3 is a block diagram of an example motion fencing system.

FIG. 3 is a block diagram of an example motion fencing system 300. For example, motion fencing system 300 can be a component or subsystem of a mobile device. Motion fencing system 300 can be configured to define multiple motion domains, as described above. In the example system 300, three motion fences and four motion domains are illustrated. For example, motion fencing system 300 can include static motion domain 302, sparse motion domain 304, sustained motion domain 306 and rich motion domain 308. Each motion domain is separated, delineated or bounded by a motion fence, as indicated by the dashed lines between each motion domain in FIG. 3.

In some implementations, motion fencing system 300 can be used to conserve energy on the mobile device. For example, the mobile device can be placed into a low power mode when the mobile device is not being operated by a user. The user may put the mobile device in the user's pocket, on a table or at some other location that indicates that the mobile device should operate in a low power mode. When the mobile device is in low power mode some components (e.g., sensors, microcontrollers, memory, processors, etc.) can be turned off or placed in a low power operating mode. When the mobile device is in low power mode, some sensors can remain turned on so that a sensor can invoke or turn on other components of the mobile device based on events detected by the powered on sensor.

In some implementations, motion sensor 310 can be turned on or woke up when the mobile device is in a low power operating mode. For example, motion sensor 310 can be an accelerometer, gyroscope, or other type of motion sensor. Motion sensor 310 can be configured to detect motion of the mobile device and compare the detected motion to threshold motion value(s) 312. For example, motion sensor 310 can compare the magnitude and/or frequency of the detected motion (e.g., motion signal) to the threshold motion value(s) to determine whether the detected motion exceeds the threshold motion value (e.g., associated with sparse motion fence 342). If the detected motion exceeds the threshold motion value(s), then the motion fencing system 300 can transition from static motion domain 302 to sparse motion domain 304, for example.

In some implementations, when motion sensor 310 determines that the detected motion exceeds the threshold motion value 312, motion sensor 310 can turn on or wake up low power micro controller 314. For example, the motion fencing system 300 can be configured to turn on or make available additional computing resources as the mobile device transitions from a lower motion domain (e.g., static domain 302) to a higher motion domain (e.g., sparse motion domain 304) to perform more complex processing of the motion signal. For example, in addition to the low power micro controller 314, additional memory resources can be made available to the low power micro controller when the mobile device enters the sparse motion domain 304.

In some implementations, low power micro controller 314 can be configured to derive a subset of motion features 316 and compare the motion features to motion criteria 318 to determine if the mobile device should move into the sustained motion domain 306. For example, the low power micro controller 314 can be configured to process the motion signal received from the motion sensor to integrate the motion signal (e.g., integrate the accelerometer signal to determine speed) and/or determine the amplitude variance of the motion signal. The result of this processing can be compared to sparse motion criteria 318 (e.g., integral and/or variance threshold values) to determine whether the mobile device should move into the sustained motion domain 306. For example, if the calculated integral value and/or variance value exceeds threshold values for the integral and/or variance as defined by the sparse motion criteria, then the mobile device can be moved into the sustained motion domain 306.

In some implementations, when low power micro controller 314 determines that the derived subset of motion features 316 exceeds the sparse motion criteria 318 (e.g., associated with the sparse motion fence 342), low power micro controller 314 can turn on or wake up high power micro controller 320. For example, low power micro controller can turn on or trigger additional computing resources needed to process motion signals in the sustained motion domain 306 as part of the transition from the sparse motion domain 304 to sustained motion domain 306. These additional computing resources can include high power micro controller 320 and/or memory and/or other processors.

In some implementations, high power micro controller 320 can process the motion signal received from motion sensor 310 to derive a full set of motion features 322. For example, high power micro controller 320 can transform the motion signal (e.g., using a Fast Fourier Transform), collect statistics describing the motion signal over time (e.g., 20 or 30 seconds) and/or apply filters to the signal to generate a full set of motion features 322.

In some implementations, high power microcontroller 320 can analyze the full set of motion features to identify specific motions of the mobile device. For example, the full set of motion features can be compared to patterns of motion associated with known motions (e.g., a flick, tap, bump, etc.) performed by a user with the mobile device. In some implementations, a client application or function can register to be notified when a specific motion of the mobile device has occurred. For example, a client application can register to be notified when a "flick" motion (e.g., a quick directional motion of the mobile device by the user) has been detected or identified by high power micro controller 326. High power micro controller can analyze the motion signal to determine when the flick motion has occurred and can cause the registered client application to be notified of the detected motion.

In some implementations, high power micro controller 320 can compare the full set of motion features with sustained motion criteria 324 to determine if the mobile device should transition into the rich motion domain 308. For example, sustained motion criteria can be used to define sustained motion fence 344 and can include frequency patterns that can be compared to a motion signal that has been transformed using a Fast Fourier transform or other suitable transform. Sustained motion criteria can include recurring patterns of motion over time. In some implementations, if a frequency pattern is observed in the motion signal or recurring pattern of motion is observed in the motion signal, then the mobile device can be moved into rich motion domain 308.

In some implementations, when high power micro controller 320 determines that the full set of motion features 322 exceeds the sustained motion criteria (e.g., associated with the sustained motion fence 344), high power micro controller 320 can turn on main processor 328. For example, high power micro controller 320 can turn on or trigger additional computing resources needed to process motion signals in the rich motion domain 308 as part of the transition from the sustained motion domain 306 to the rich motion domain 308. These additional computing resources can include main processor 328 and/or memory and/or other processors.

In some implementations, main processor 328 can analyze the motion signal received from motion sensor 310, the subset of motion features generated by low power micro controller 314 and/or the full set of motion features generated by high power micro controller 320 to classify the motion detected by the mobile device into specific activities 330. For example, main processor 328 can analyze the patterns of motion, frequency domain characteristics and/or other signal features to determine the current activity of a user who is operating or holding (e.g., in hand, pocket, in car, etc.) the mobile device. For example, main processor 328 can analyze the motion signal to determine whether the user associated with the mobile device is walking, running, driving, or biking, for example. If the main processor 328 determines that the user is driving, the main processor 328 can turn on positioning system 332 to provide a location of the mobile device, for example. If the user is walking, the main processor 328 can invoke algorithms or functions to count the steps of the user 334, for example. If a client application has registered with motion fencing system 300 to be notified when the user is running, the main processor 328 can notify the registered client that the user is currently running with the mobile device.

Example Process

Figure 4:
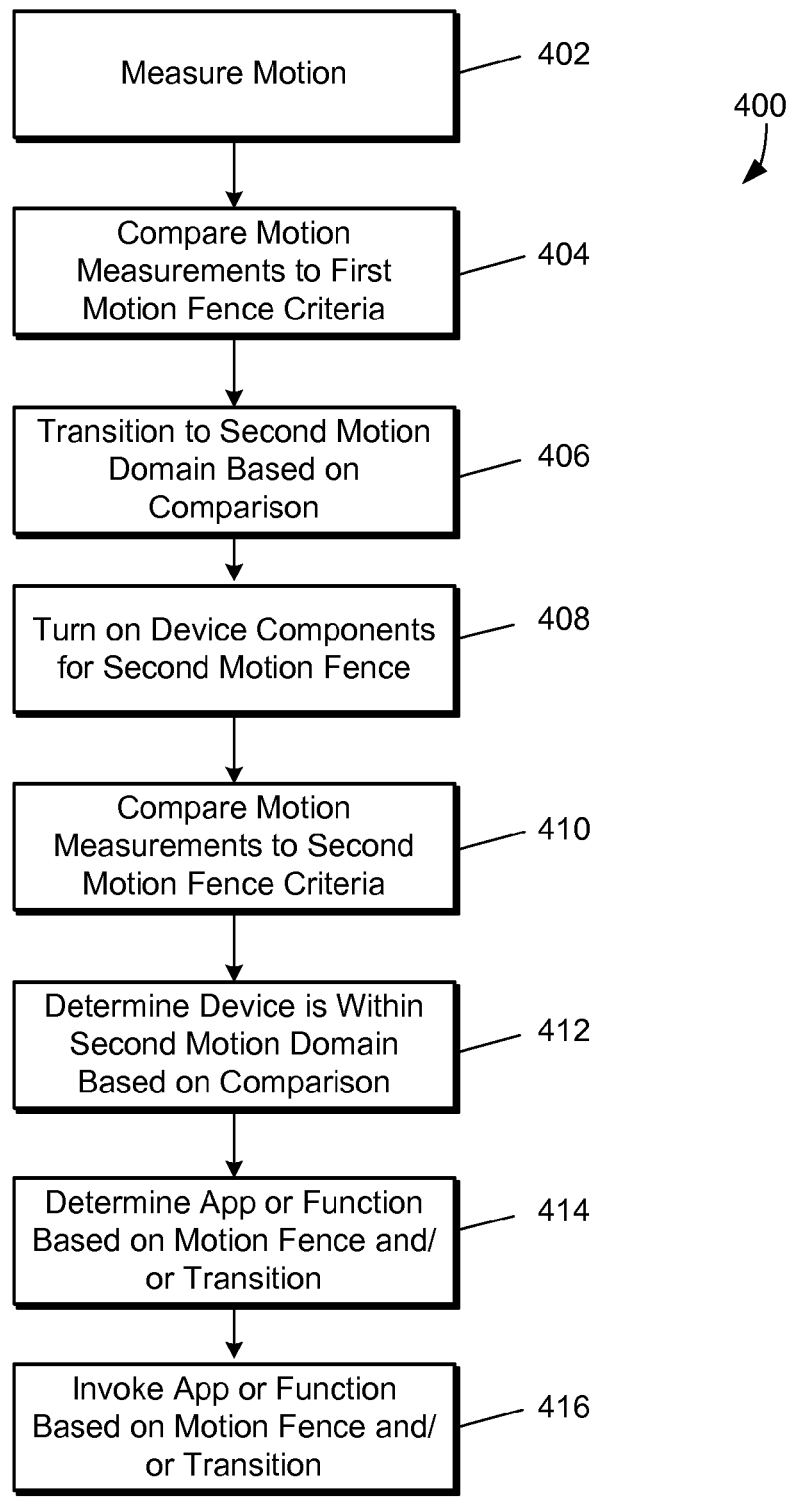
FIG. 4 is flow diagram of an example motion fencing process.

FIG. 4 is flow diagram of an example motion fencing process. For example, the motion fencing process can be performed by a mobile device that has been configured with motion fencing criteria, as described above. In some implementations, motion fencing clients within the mobile device (e.g., applications, functions, utilities, operating system features, etc.) can register to get notified when motion corresponding to an activity of interest has occurred. The notification can be in the form of a message, event, invocation or other operation that is triggered based on the activity of interest (e.g., running, biking, driving, etc.) being detected by the motion fencing system of the mobile device.

At step 402, the motion of the mobile device can be measured. For example, the mobile device can be configured with one or more motion sensors that can measure the motion of the mobile device. The motion sensors can include an accelerometer, gyroscope and/or other types of motion sensors. The measured motion can generate a motion signal over time that indicates the magnitude of the motion at various points in time.

At step 404, the measured motion can be compared to the motion criteria associated with a first motion fence. For example, the motion signal can be compared to motion criteria, such as threshold values for frequency, magnitude, etc. The motion criteria can include thresholds on other motion measurements derived from the motion signal. The motion criteria can include patterns of motion (e.g., repeated frequency and or magnitude patterns) to determine if the motion of the mobile device falls within or is outside the first motion fence. For example, the existence of a pattern of motion (e.g., any pattern of motion) within the motion signal can be a criterion by which a motion fence is defined. For example, if there is no pattern within the motion signal, the mobile device can remain within the current motion fence. If there is a pattern of motion within the motion signal, the mobile device has crossed the motion fence into another motion domain.

At step 406, the mobile device can transition from a first motion domain to a second motion domain based on the comparison. For example, if the motion criteria for the first motion fence has been exceeded (e.g., threshold values exceeded, types of motion observed), then the mobile device can move from the current motion domain across the first motion fence and into a second motion domain.

At step 408, device components for the second motion domain can be turned on or woken from a sleep state. For example, the mobile device can start in a low power mode. As the mobile device transitions from the first motion domain to the second motion domain, components of the mobile device can be turned on (or awakened from a sleep state) to analyze the motion signals generated by the motion sensor of the mobile device. For example, when in the first motion domain, the mobile device can be in a low power mode with only the motion sensor turned on. When the mobile device transitions from the first motion domain to the second motion domain, the motion sensor can turn on a micro controller to perform additional analysis of the motion signal, as described above.

At step 410, the measured motion can be compared to the motion criteria associated with a second motion fence. For example, the second motion fence can be associated with motion criteria that are different than the first motion fence. The motion criteria for the second motion fence can describe more complex types of motion than the first motion fence, for example. The second motion fence criteria can include patterns of motion, values generated from transformations of the motion signal, data generated from analysis of the motion signal over time and/or other types of motion characteristics.

At step 412, the device can be determined to be within the second motion domain based on the motion criteria. For example, if the motion signal does not meet or exceed the motion criteria for the second motion fence, the mobile device will not cross the second motion fence into another motion domain. Thus, the mobile device can be determined to be within the second motion domain.

At step 414, an application or function that registered interest in the second motion domain or transition can be determined. For example, the motion fencing system can maintain a lookup table that identifies applications and/or functions of the mobile device that are interested in an activity associated with a type of motion and/or motion domain. When it is determined that a mobile device is within a particular motion domain, the motion fencing system can reference the lookup table to determine which applications or functions (e.g., motion fencing clients) are interested in the particular motion domain. In some implementations, the motion fencing system can identify particular activities associated with the motion domain based on the pattern of motion observed in the motion signal. When an activity is identified based on the motion signal, the motion fencing system can use the lookup table to determine which applications and/or functions are interested in the occurrence of the observed activity.

At step 416, the registered application or function can be invoked. For example, when the motion fencing system finds an application or function associated with the particular motion domain that the mobile device is currently within or an identified activity, the application or function can be notified that the mobile device is within the motion domain or that the particular activity is occurring. In some implementations, the notifying the application or function can include invoking an application or function of the mobile device.

Application Programming Interfaces

One or more Application Programming Interfaces (APIs) may be used in implementations described herein. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some implementations, the API-implementing component may provide more than one API, that provide access to different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other implementations, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call.

Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (e.g., the API-implementing component and the API-calling component may be the same or different type of module from each other). API-implementing components may in some cases be embodied at least in part in firmware, microcode, or other hardware logic.

In some implementations, an API may allow a client program to use the services provided by a Software Development Kit (SDK) library. In other embodiments an application or other client program may use an API provided by an Application Framework. In these implementations, the application or client program may incorporate calls to functions or methods provided by the SDK and/or provided by the API or use data types or objects defined in the SDK and provided by the API. An Application Framework may in these implementations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (e.g., on the same data processing system as the API-implementing component) or a remote component (e.g., on a different data processing system from the API-implementing component) that communicates with the API-implementing component through the API over a network. An API-implementing component may also act as an API-calling component (e.g., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component, thus the API may include features for translating calls and returns between the API-implementing component and the API-calling component. However the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 5:
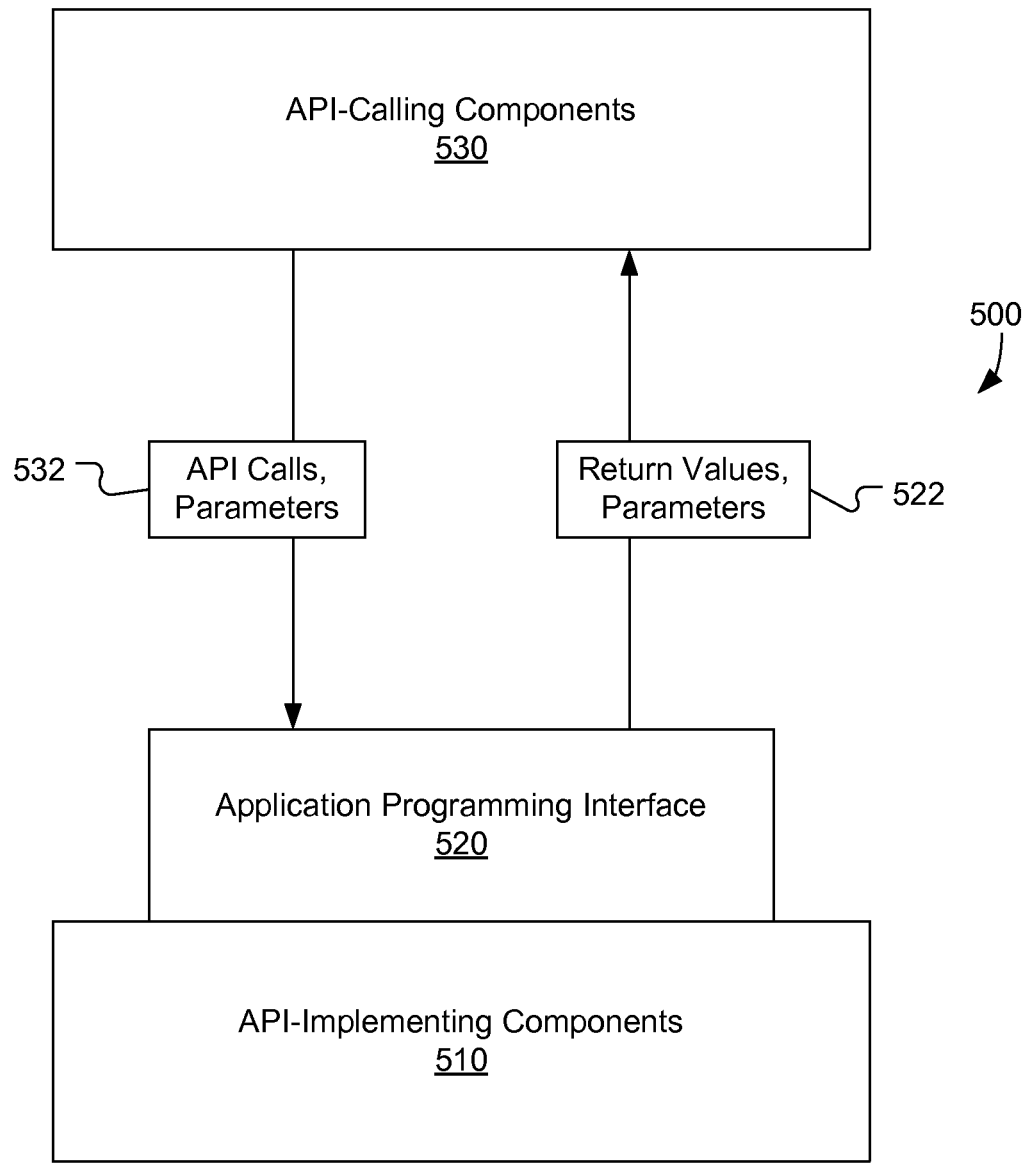
FIG. 5 is a block diagram illustrating an example API architecture, which can be used in some implementations.

FIG. 5 is a block diagram illustrating an example API architecture 500, which can be used in some implementations. As shown in FIG. 5, the API architecture 500 includes the API-implementing component 510 (e.g., an operating system, a library, a device driver, an API, an application program, software or other module) that implements the API 520. The API 520 can specify one or more functions, methods, classes, objects, protocols, data structures, formats and/or other features of the API-implementing component that may be used by the API-calling component 530. The API 520 can specify at least one calling convention that specifies how a function in the API-implementing component receives parameters 532 from the API-calling component and how the function returns a result 522 to the API-calling component. The API-calling component 530 (e.g., an operating system, a library, a device driver, an API, an application program, software or other module), makes API calls through the API 520 to access and use the features of the API-implementing component 510 that are specified by the API 520. The API-implementing component 510 may return a value through the API 520 to the API-calling component 530 in response to an API call.

For example, the API-implementing component 510 can include additional functions, methods, classes, data structures, and/or other features that are not specified through the API 520 and are not available to the API-calling component 530. The API-calling component 530 may be on the same system as the API-implementing component 510 or may be located remotely and accesses the API-implementing component 510 using the API 520 over a network. While FIG. 5 illustrates a single API-calling component 530 interacting with the API 520, other API-calling components, which may be written in different languages (or the same language) than the API-calling component 530, may use the API 520.

The API-implementing component 510, the API 520, and the API-calling component 530 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 6:
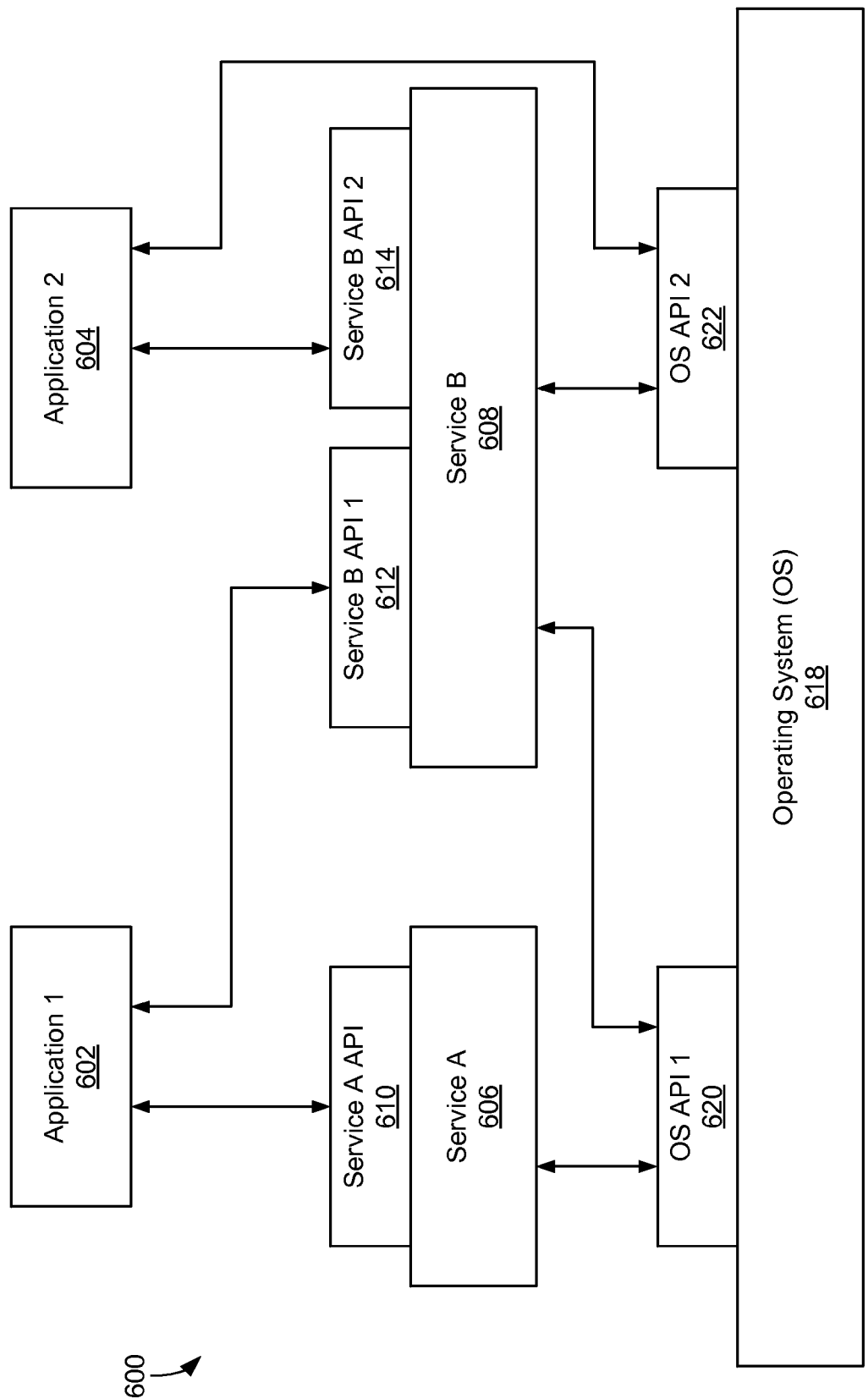
FIG. 6 illustrates an example software stack that includes various application programming interfaces.

FIG. 6 illustrates an example software stack 600 that includes various application programming interfaces. As illustrated by FIG. 6, applications 602 and 604 can make calls to Service A 606 or Service B 608 using several Service APIs 610-616 and to Operating System (OS) 618 using several OS APIs 620-622. Service A 606 or Service B 608 can make calls to OS using several OS APIs 620-622.

Note that the Service B 608 has two APIs 612 and 614, one of which, Service B API 1 612, receives calls from and returns values to Application 1 602 and the other, Service B API 2 614, receives calls from and returns values to Application 2 604. Service A 606 (which can be, for example, a software library) makes calls to and receives returned values from OS API 1 620, and Service B 622 (which can be, for example, a software library) makes calls to and receives returned values from both OS API 1 620 and OS API 2 622. Application 2 604 makes calls to and receives returned values from OS API 2 622.

Example System Architecture

Figure 7:
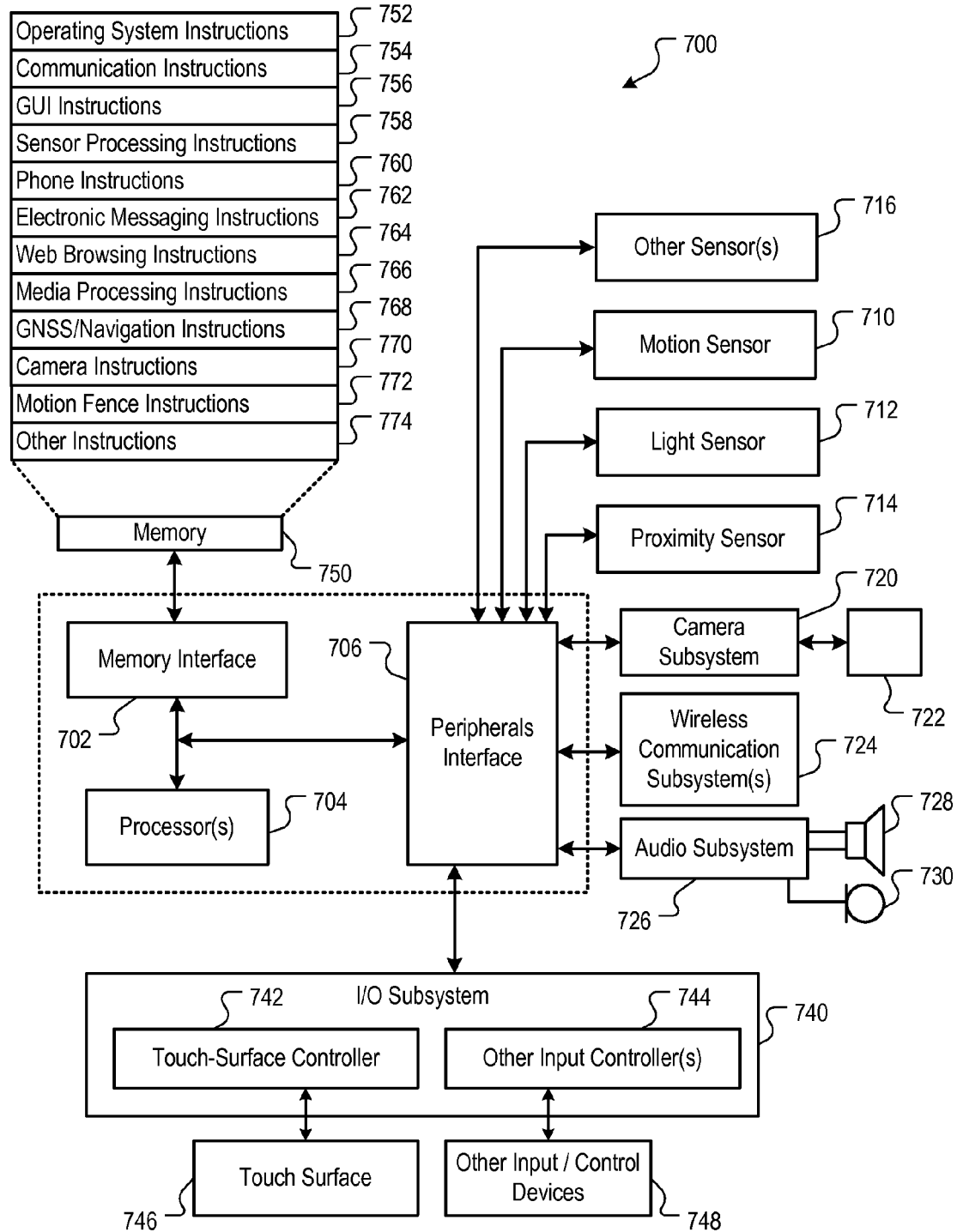
FIG. 7 is a block diagram of an exemplary system architecture implementing the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voiceprinting and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and motion or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing motion fencing. For example, operating system 752 can implement the motion fencing features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store software instructions 772 to facilitate other processes and functions, such as the motion fencing processes and functions as described with reference to FIGS. 1-6. For example, software instructions 772 can include instructions for determining the current motion domain of the mobile device and notifying or invoking applications based on the current motion domain.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

What is claimed is:

1. A method comprising:
   receiving, by a motion fencing system of a mobile device and from a client component of the mobile device, a request that, when motion of the mobile device corresponds to an activity specified in the request, the motion fencing system shall notify the client component;
   mapping, by the motion fencing system, the activity to a motion domain that is defined by at least one of magnitude, duration, or frequency of the motion of the mobile device;
   determining, by the motion fencing system operating in a first power mode and using an amount of motions detected by a sensor, that the mobile device is in the motion domain of the activity upon determining that the motion of the mobile device satisfies at least one of the magnitude, duration, or frequency of motion;
   upon determining that the mobile device is in the motion domain, determining, by the motion fencing system in a second power mode and using patterns of motion detected by a sensor, that the motion of the mobile device corresponds to the activity; and
   notifying the client component by the motion fencing system, including causing the client component to turn on or turn off one or more functions of the mobile device,
   wherein the motion fencing system includes a processor that is configured to recognize the patterns, the processor being turned off in the first power mode and turned on in the second power mode.

2. The method of claim 1, wherein the activity corresponds to one or more motion patterns detected by the mobile device, and determining that the motion of the mobile device corresponds to the activity comprises determining that the motion of the mobile device corresponds to at least one of the one or more motion patterns.

3. The method of claim 2, wherein notifying the client component includes invoking one or more applications, functions, or utilities of the mobile device.

4. The method of claim 1, wherein notifying the client component comprises turning on one or more components of the mobile device, the one or more components including a microprocessor.

5. The method of claim 1, wherein the motion comprises one of:
   a static motion domain corresponding to zero amount of motion;
   a sparse motion domain corresponding to a non-zero amount of motion;
   a sustained motion domain corresponding to an amount of motion that has been sustained for a period of time; and a rich motion domain corresponding to an amount of motion that exceeds a threshold magnitude, or exceeds a threshold frequency, or both, for longer than a threshold period of time.

6. The method of claim 1, wherein notifying the client component comprises adjusting a power level of one or more components of the mobile device.

7. A non-transitory computer-readable medium storing one or more sequences of instructions which, when executed by one or more processors, cause the one or more processors to perform operations comprising:

receiving, by a motion fencing system of a mobile device and from a client component of the mobile device, a request that, when motion of the mobile device corresponds to an activity specified in the request, the motion fencing system shall notify the client component;

mapping, by the motion fencing system, the activity to a motion domain that is defined by at least one of magnitude, duration, or frequency of the motion of the mobile device;

determining, by the motion fencing system operating in a first power mode and using an amount of motions detected by a sensor, that the mobile device is in the motion domain of the activity upon determining that the motion of the mobile device satisfies at least one of the magnitude, duration, or frequency of motion;

upon determining that the mobile device is in the motion domain, determining, by the motion fencing system in a second power mode and using patterns of motion detected by a sensor, that the motion of the mobile device corresponds to the activity; and notifying the client component by the motion fencing system, including causing the client component to turn on or turn off one or more functions of the mobile device, wherein the motion fencing system includes a processor that is configured to recognize the patterns, the processor being turned off in the first power mode and turned on in the second power mode.

8. The non-transitory computer-readable medium of claim 7, wherein the activity corresponds to one or more motion patterns detected by the mobile device, and determining that the motion of the mobile device corresponds to the activity comprises determining that the motion of the mobile device corresponds to at least one of the one or more motion patterns.

9. The non-transitory computer-readable medium of claim 8, wherein notifying the one or more clients includes turning on one or more components of the mobile device, the one or more components including a microprocessor.

10. The non-transitory computer-readable medium of claim 7, the operations comprising, upon determining that the motion of the mobile device corresponds to the activity, turning off one or more components of the mobile device.

11. The non-transitory computer-readable medium of claim 7, wherein the motion domain comprises one of:

a static motion domain corresponding to zero amount of motion;

a sparse motion domain corresponding to a non-zero amount of motion;

a sustained motion domain corresponding to an amount of motion that has been sustained for a period of time; and a rich motion domain corresponding to an amount of motion that exceeds a threshold magnitude, or exceeds a threshold frequency, or both, for longer than a threshold period of time.

12. The non-transitory computer-readable medium of claim 10, the operations comprising, upon determining that the motion of the mobile device that the motion of the mobile device corresponds to the activity, adjusting a power level of one or more components of the mobile device.

13. A system comprising:

one or more processors; and a non-transitory computer-readable medium storing one or more sequences of instructions which, when executed by the one or more processors, cause the one or more processors to perform operations comprising:

receiving, by a motion fencing system of a mobile device and from a client component of the mobile device, a request that, when motion of the mobile device corresponds to an activity specified in the request, the motion fencing system shall notify the client component;

mapping, by the motion fencing system, the activity to a motion domain that is defined by at least one of magnitude, duration, or frequency of the motion of the mobile device;

determining, by the motion fencing system operating in a first power mode and using an amount of motions detected by a sensor, that the mobile device is in the motion domain of the activity upon determining that the motion of the mobile device satisfies at least one of the magnitude, duration, or frequency of motion;

upon determining that the mobile device is in the motion domain, determining, by the motion fencing system in a second power mode and using patterns of motion detected by a sensor, that the motion of the mobile device corresponds to the activity; and notifying the client component by the motion fencing system, including causing the client component to turn on or turn off one or more functions of the mobile device, wherein the motion fencing system includes a processor that is configured to recognize the patterns, the processor being turned off in the first power mode and turned on in the second power mode.

14. The system of claim 13, wherein the activity corresponds to one or more motion patterns detected by the mobile device, and determining that the motion of the mobile device corresponds to the activity comprises determining that the motion of the mobile device corresponds to at least one of the one or more motion patterns.

15. The system of claim 14, wherein notifying the client component includes invoking one or more clients.

16. The system of claim 13, the operations comprising, upon determining that the motion the mobile device corresponds to the activity, turning on one or more components of the mobile device.

17. The system of claim 16, wherein the motion domain comprise one of:

a static motion domain corresponding to zero amount of motion;

a sparse motion domain corresponding to a non-zero amount of motion;

a sustained motion domain corresponding to an amount of motion that has been sustained for a period of time; and a rich motion domain corresponding to an amount of motion that exceeds a threshold magnitude, or exceeds a threshold frequency, or both, for longer than a threshold period of time.

18. The system of claim 16, the operations comprising, upon determining that the motion of the mobile device corresponds to the activity, adjusting a power level of one or more components of the mobile device.

* * * * *

UNITED STATES PATENT AND TRADEMARK OFFICE
CERTIFICATE OF CORRECTION

PATENT NO.        : 9,600,049 B2
APPLICATION NO.   : 13/913234
DATED             : March 21, 2017
INVENTOR(S)       : Hung A. Pham, Parin Patel and Venu M. Duggineni Page 1 of 1

It is certified that error appears in the above-identified patent and that said Letters Patent is hereby corrected as shown below:

In the Claims

Column 16, Line 3-4, Claim 12, before "corresponds" delete "that the motion of the mobile device"; and Column 16, Line 51, Claim 16, after "motion" insert --of--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*